United States Patent [19]

Horikawa et al.

[11] Patent Number: 4,527,061
[45] Date of Patent: Jul. 2, 1985

[54] RADIATION IMAGE READ-OUT METHOD AND APPARATUS

[75] Inventors: Kazuo Horikawa; Satoshi Arakawa, both of Kanagawa, Japan

[73] Assignee: Fuji Photo Film Co., Ltd., Kanagawa, Japan

[21] Appl. No.: 444,148

[22] Filed: Nov. 24, 1982

[30] Foreign Application Priority Data

Nov. 25, 1981 [JP] Japan .............................. 56-188661

[51] Int. Cl.³ .............................................. G03C 5/16
[52] U.S. Cl. .............................. 250/327.2; 250/484.1
[58] Field of Search .................. 250/327.2, 484.1, 337; 364/414

[56] References Cited

U.S. PATENT DOCUMENTS 4,284,889 8/1981 Kato et al. ......................... 250/354.1

Primary Examiner—Janice A. Howell
Assistant Examiner—Carolyn E. Fields
Attorney, Agent, or Firm—Sughrue, Mion, Zinn, Macpeak & Seas

[57] ABSTRACT

In a radiation image read-out system in which a stimulable phosphor sheet carrying a radiation image stored thereon is exposed to stimulating rays, and light emitted from the phosphor sheet is photoelectrically read out to reproduce a visible image, the gradient of a decay curve of the phosphor sheet is detected by exposing the phosphor sheet to stimulating rays and detecting the light emitted therefrom. Preliminary read-out for reading out image input information stored on the phosphor sheet is then conducted by using stimulating rays having stimulation energy lower than stimulation energy of stimulating rays used in final read-out. On the basis of the decay curve gradient and the image input information, read-out conditions in the final read-out and image processing conditions are set. The final read-out is conducted within one hour after the phosphor sheet is exposed to the stimulating rays for detecting the decay curve gradient.

14 Claims, 2 Drawing Figures

RADIATION IMAGE READ-OUT METHOD AND APPARATUS

BACKGROUND OF THE INVENTION

1. Filed of the Invention

This invention relates to a radiation image read-out method in which a stimulable phosphor sheet carrying a radiation image stored therein is exposed to stimulating rays which causes it to emit light in the pattern of the stored image, and the emitted light is photoelectrically read out by a photodetector and apparatus for carrying out the method.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation transmitting through an object to have a radiation image stored therein, and is then scanned with stimulating rays such as laser beam which causes it to emit light in the pattern of the stored image. The light emitted from the stimulable phosphor sheet upon stimulation thereof is photoelectrically detected and converted to an electric image signal, which is processed as desired to reproduce a visible image on a recording medium such as photographic light-sensitive material or on a display such as cathode ray tube (CRT).

This radiation image system using the stimulable phosphor sheet is advantageous over the conventional radiography using a silver halide photographic material in that the image can be recorded over a very wide range of radiation exposure and further in that the electric signal used for reproducing the visible image can be freely processed to improve the image quality for viewing, particularly diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and converting it to an electric signal to reproduce a visible image on a recording medium or a display. The electric signal may further be processed as desired to obtain a radiation image suitable for viewing, particularly diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a change in radiation dose due to fluctuating tube voltage or MAS value of the radiation source, a variation in the sensitivity of the stimulable phosphor or the photodetector, a change in radiation dose according to the condition of the object, or a change in the radiation transmittance according to the object etc. Further, it is possible to obtain a desirable radiation image even when the radiation dose to the object is reduced. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in accordance with the portion of a human body such as the heart, the chest etc. and improve the diagnostic efficiency and accuracy.

However, in order to eliminate various influences based on the fluctuation of radiographic exposure conditions and/or obtain a radiation image having a high image quality or a high diagnostic efficiency and accuracy, it is necessary to investigate the image input condition of the radiation image stored on the stimulable phosphor sheet such as recording with a high or low radiation dose or the image input pattern, which is determined by the radiographic method such as portion image (e.g. chest and abdomen), plain image or contrasted image radiographing, before reproducing the radiation image to a visible image, and appropriately adjust the read-out gain or appropriately process the electric signal based on the investigated image input condition or the image input pattern. The image input condition and the image input pattern will hereinafter be simply referred to as the image input information when they should be expressed generically. It is also necessary to determine the scale factor to optimize the resolution according to the contrast of the image input pattern.

The investigation of the image input information may be conducted prior to the visible image reproduction by use of the method disclosed in U.S. Pat. No. 4,284,889, which is based on the finding that the amount of light instantaneously emitted from the stimulable phosphor sheet upon exposure thereof to a radiation is proportional to the amount of the radiation energy stored in the stimulable phosphor. In this method, image input information is investigated by detecting the instantaneously emitted light, and an appropriate signal processing is conducted based on the image input information in order to obtain a visible radiation image having an improved image quality, particularly a high diagnostic efficiency and accuracy. With this method, since it is possible to appropriately adjust the read-out gain, select an appropriate scale factor, or conduct an appropriate signal processing, a radiation image suitable for viewing and diagnostic purposes can be obtained regardless of fluctuation of the radiographic exposure conditions. However, since the recording of a radiation image on the stimulable phosphor sheet and read out of the recorded image from the stimulable phosphor sheet are usually performed at different locations, a signal transfer system must be formed therebetween, necessitating a complicated apparatus and a high cost.

Further, U.S. Pat. No. 4,276,473 discloses a method of estimating the image input condition or image input pattern of a radiation image stored in the stimulable phosphor by positioning a non-stimulable phosphor in the vicinity of the stimulable phosphor sheet, and detecting the light emitted from the non-stimulable phosphor upon exposure thereof to a radiation by use of a photodetector. However, this method also has the same drawback as that of the method disclosed in aforesaid U.S. Pat. No. 4,284,889. Further, since the stimulable phosphor itself for recording the radiation image is not used as the detecting means for the image input information and it is only an indirect detecting means, it is impossible to obtain the image input information which is sufficiently reliable.

Various experiments conducted by the inventors revealed that a radiation image suitable for viewing, particularly diagnostic purposes can be obtained regardless of fluctuation of the radiographic exposure conditions by conducting in advance a read-out operation for investigating the image input information of a radiation image stored in a stimulable phosphor (hereinafter referred to as the preliminary read-out) by use of stimulating rays having stimulation energy lower than stimulation energy of stimulating rays used in a read-out operation for obtaining a visible image for viewing and diagnostic purposes (hereinafter referred to as the final read-out), thereafter conducting the final read-out. In the final read-out, the read-out gain is adjusted, and/or the scale factor is determined, and/or the image processing conditions are determined appropriately based on the image input information obtained by the preliminary read-out. The read-out gain and the scale factor are together referred to as the read-out conditions. It has heretofore been considered necessary to detect as much light as possible with a photodetector, as described in U.S. Pat. Nos. 4,258,264 and 4,302,671, and 4,346,295 (DE-OS No. 2,951,501), since the amount of light emitted from the stimulable phosphor upon stimulation thereof by stimulating rays is very small even when the stimulable phosphor having the highest sensitivity among those available was selected. In view of the above state of the art, since it is beyond the imagination of the skilled in the art to dissipate intentionally the radiation energy stored in the stimulable phosphor for only the purpose of investigating the image input information, the above findings are unexpected.

On the basis of these findings, the inventors proposed in Japanese Patent Application Nos. 56(1981)-165111, 56(1981)-165112, 56(1981)-165113, 56(1981)-165114 and 56(1981)-165115 combined into U.S. patent application Ser. No. 434,886 a method of and apparatus for reading out a radiation image in which, before conducting the final read-out for obtaining a visible image for viewing and diagnostic purposes, the preliminary read-out is carried out to investigate the image input information of the radiation image stored on the stimulable phosphor sheet by use of stimulating rays having stimulation envergy lower than stimulation energy of stimulating rays used in the final read-out.

The stimulation energy referred to in this invention means the effective energy of the stimulating rays which the stimulable phosphor sheet receives per unit area.

In the method just described above, the stimulation energy of the stimulating rays applied to the stimulable phosphor in the preliminary read-out should be lower than the stimulation energy of the stimulating rays used in the final read-out. As the ratio of the stimulation energy of the stimulating rays in the preliminary read-out to the stimulation energy of the stimulating rays in the final read-out increases near to 1, the amount of the radiation energy remaining in the stimulable phosphor after the preliminary read-out decreases. It has been found that, when the ratio is smaller than 1, it is possible to obtain a radiation image suitable for viewing and diagnostic purposes by appropriately adjusting the read-out gain. However, in order to obtain a radiation image having an improved image quality, particularly a high diagnostic efficiency and accuracy, the aforesaid ratio should preferably be as small as possible insofar as the image input information of the radiation image stored in the stimulable phosphor can be detected sufficiently to determine the read-out conditions or the image processing conditions, that is, insofar as the light emitted from the stimulable phosphor in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the accuracy of the system for detecting the light emitted from the stimulable phosphor in the preliminary read-out.

In order to make the stimulation energy of the stimulating ray in the preliminary read-out smaller than the stimulation energy of the stimulating rays in the final read-out, it is possible to use any known method. For example, the output level of the laser source used in the preliminary read-out may be decreased, the beam diameter of the laser beam may be increased, the scanning speed of the laser beam may be increased, or the moving speed of the stimulable phosphor sheet may be increased.

In the above-described method, since the image input condition of a radiation image stored in the stimulable phosphor can be investigated in advance, it is possible to obtain a radiation image having an improved image quality, particularly a high diagnostic efficiency and accuracy regardless of fluctuation of the radiographic exposure conditions by adjusting the read-out gain based on the investigated image input information without using a read-out system having a wide dynamic range. Further, since the image input pattern of the radiation image stored in the stimulable phosphor can be investigated in advance, it is possible to obtain a radiation image having an improved image quality, particularly a high diagnostic efficiency and accuracy by processing the read-out electric signal suitable according to the image input pattern, and/or by optimizing the scale factor. It is also possible to reduce the read-out time by omitting the final read-out for a portion of the stimulable phosphor carrying no image.

In the above-mentioned method, since the radiation energy stored in the stimulable phosphor decays with time, the interval between the preliminary read-out and the final read-out should be minimized in order to effectively use the image input information obtained in the preliminary read-out for the final read-out. When the difference between the amount of the radiation energy stored at the time of preliminary read-out and that at the time of final read-out is 10% or less, it is possible to obtain a radiation image having a practically sufficient image quality, particularly sufficient diagnostic efficiency and accuracy by detecting the image input information of the radiation image stored in the stimulable phosphor and setting the final read-out conditions and/or the signal processing conditions by use of the detected image input information. Accordingly, it is considered preferable that the preliminary read-out be conducted within one hour before the final read-out is started.

However, it was found that the decay characteristics of the intensity of light emitted from the stimulable phosphor when the stimulable phosphor is exposed to stimulating rays having a predetermined intensity generally differs according to the time elapsed after a radiation image is recorded in the stimulable phosphor. Therefore, if the interval between the radiation image recording and the preliminary read-out varies, it is not always possible to correctly estimate the amount of light emitted from the stimulable phosphor upon stimulation thereof at the time of the final read-out based on the image input information obtained by the preliminary read-out and to select optimal final read-out conditions even when the interval between the preliminary read-out and the final read-out is always maintained constant. FIG. 1 shows the decay characteristics of the amount of light emitted from the stimulable phosphor upon exposure thereof to stimulating rays having a predetermined intensity with respect to the stimulation time period. In FIG. 1, the curve A shows the decay characteristics obtained when the exposure of the stimulable phosphor to the stimulating rays is started 30 seconds after a radiation image is recorded therein, the curve B shows the decay characteristics obtained when the exposure thereof is started one hour after the radiation image recording, and the curve C shows the decay characteristics obtained when the exposure is started four hours after the radiation image recording. The vertical axis of the graph indicates an amount of light emission normalized to 100 at the initial value. As shown in FIG. 1, the decay curve obtained by exposing the stimulable phosphor to stimulating rays having a predetermined intensity changes according to the interval between the radiation image recording and the exposure to the stimulating rays. Accordingly, even when the interval between the preliminary read-out and the final read-out is always maintained constant, it is not always possible to correctly estimate the amount of light emitted from the stimulable phosphor upon stimulation thereof at the time of the final read-out based on the integrated value of the light emission amount determined by the preliminary read-out.

SUMMARY OF THE INVENTION

The primary object of the present invention is to provide an improved radiation image read-out method in which a stimulable phosphor sheet carrying a radiation image therein is exposed to stimulating rays which causes it to emit light in the pattern of the stored image, and the emitted light is read out by a photodetector.

Another object of the present invention is to provide a radiation image read-out method which makes it possible to conduct the final read-out under the optimal read-out conditions and/or optimal image processing based on the image input information obtained by the preliminary read-out.

The specific object of the present invention is to provide a radiation image read-out method which makes it possible to achieve the final read-out under the optimal read-out conditions and/or the image processing under the optimal image processing conditions even when the interval between the radiation image recording and the preliminary read-out changes.

A still further object of the present invention is to provide an apparatus for carrying out the above methods.

The above objects are accomplished by detecting the gradient of the decay curve of a stimulable phosphor sheet carrying a radiation image stored therein by exposing the phosphor sheet to stimulating rays which causes it to emit light in proportion to the radiation energy stored therein and detecting the emitted light, and setting the read-out conditions in final read-out and/or the image processing conditions based on the detected gradient of the decay curve and image input information obtained by preliminary read-out.

By detecting the gradient of the decay curve, it is possible to experimentally determine the whole shape of decay curve. Accordingly, it becomes possible to correctly estimate the amount of light emitted from the stimulable phosphor sheet in the final read-out based on the image input information obtained by the preliminary read-out. This will be understood also from FIG. 1.

In the present invention, the gradient of the decay curve of the stimulable phosphor sheet may be detected, for example, by exposing the phosphor sheet to stimulating rays having a predetermined intensity for a certain period and detecting the light emitted from the phosphor sheet at two or more points of time during the exposure thereof to the stimulating rays, or by exposing the phosphor sheet twice or more to the stimulating rays and detecting the light emitted from the phosphor sheet, thereby determining the change in the amount of the emitted light with time.

When the stimulable phosphor sheet is exposed twice or more to stimulating rays in order to detect the gradient of the decay curve, it is desirable that the time interval between the first exposure and the last exposure is short.

Further, in the present invention, it is preferable that the time interval between the exposure of the stimulable phosphor sheet to the stimulating rays for detecting the gradient of the decay curve and the preliminary read-out be short. Otherwise, the relationship between the decay curve determined based on the detected gradient and the image input information obtained by the preliminary read-out becomes unclear, and it becomes difficult to accurately estimate the amount of light emitted from the phosphor sheet in the final read-out based on the decay curve and the image input information obtained by the preliminary read-out. To the contrary, if the decay curve at each point of time after the exposure of the phosphor sheet to the stimulating rays for detecting the decay curve can be experimentally estimated by detecting the gradient of the decay curve at one time, it is not always necessary that the time interval between the exposure of the phosphor sheet to the stimulating rays for detecting the decay curve and the preliminary read-out is short, since it is possible to experimentally estimate the decay curve at the time of the preliminary read-out by measuring the time elapsed from the exposure of the phosphor sheet to the stimulating rays for detecting the decay curve to the preliminary read-out. When the phosphor sheet is exposed twice or more to the stimulating rays for determining the decay curve, one of the two or more exposing operations may be replaced by the preliminary read-out. In this case, any one of the exposing operations may be replaced thereby.

Further, in the present invention, it is desirable that the time interval between the preliminary read-out and the final read-out is also short. However, this is not always necessary since, by measuring the time interval between the preliminary read-out and the final read-out, it is possible to experimentally determine the relationship between the decay curve determined as described above and the decay curve at the time of the final read-out, and to accurately estimate the light emitted from the phosphor sheet in the final read-out on the basis of the image input information obtained by the preliminary read-out.

In the present invention, the final read-out should preferably be conducted within one hour after the stimulable phosphor sheet is exposed to the stimulating rays for determining the decay curve. As described above, it is preferred that the time intervals between the first exposure and the last exposure of the stimulable phosphor sheet when the exposure is conducted twice or more for determining the decay curve, between the exposure of the phosphor sheet to the stimulating rays for determining the decay curve and the preliminary read-out, and between the preliminary read-out and the final read-out be short. However, when the final read-out is conducted within one hour after the phosphor sheet is exposed to the stimulating rays for determining the decay curve, it is possible to obtain a visible radiation image having a practically sufficient image quality, particularly sufficient diagnostic efficiency and accuracy.

In order to determine the decay curve of the stimulable phosphor sheet, the whole surface of the phosphor sheet may be uniformly exposed to the stimulating rays at a time, or may be scanned sequentially with the stimulating rays. When the phosphor sheet is exposed twice or more to the stimulating rays, some of the exposures sheet may be made uniformly to the stimulating rays, and the others may be made by scanning with the stimulating rays.

In the present invention, it is not necessarily required to expose the whole surface of the stimulable phosphor sheet to the stimulating ray for determining the decay curve. Thus, only a part of the phosphor sheet may be exposed thereto. When the exposure is conducted twice or more, it is, of course, necessary that the same portion of the phosphor sheet be exposed to the stimulating ray in the exposing operations.

In the present invention, in order to improve the signal-to-noise ratio, it is preferable that the stimulable phosphor emits light having a wavelength range not overlapping upon the range of wavelength of the stimulating ray employed to excite the stimulable phosphor. Preferably, when a laser source which emits stimulating ray having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the read-out time, it is preferable to use a gas ion laser source emitting a laser beam having a wavelength range shorter than 600 nm, such as an $Ar^+$ laser beam (488 nm, 514.5 nm), a $Kr^+$ laser beam (520.9 nm, 530.9 nm, 568.2 nm), or an $Ar^+$-$Kr^+$ laser beam.

As the stimulable phosphor, for example, rare earth element activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; BaQ $xAl_2O_3$:Eu wherein $0.8 \leq x \leq 10$; and $M^{II}O$ $xSiO_2$:A wherein $M^{II}$ is Mg, Ca, Sr, Zn, Cd or Ba, A is Ce, Tb, Eu, Tm, Pb, Tl, Bi or Mn, and x is number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Among the above enumerated phosphors, the rare earth element activated alkaline earth metal fluorohalide phosphor is the most preferable, among which barium fluorohalides are the most preferable in view of the high intensity of emission of light.

Further, barium fluorohalide phosphors added with a metal fluoride as disclosed in Japanese Unexamined Patent Publication Nos. 56(1981)-2385 and 56(1981)-2386, or barium fluorohalide phosphors added with at least one of a metal chloride, a metal bromide and a metal iodide as disclosed in European Patent Publication No. 29,963 are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. Pat. No. 4,394,581 (European Patent Publication No. 21,174).

As for the signal processing, it is possible to employ a frequency processing as disclosed in U.S. Pat. Nos. 4,315,318, and 4,387,428, Japanese Unexamined Patent Publication Nos. 56(1981)-75137, 56(1981)-75139 and 56(1981)-75141, and a gradation processing as disclosed in U.S. Pat. Nos. 4,302,672, 4,276,473 or 4,310,886.

DESCRIPTION OF THE PREFERRED EMBODIMENTS

The present invention will hereinbelow be described in further detail with reference to the accompanying drawings.

Figure 1:
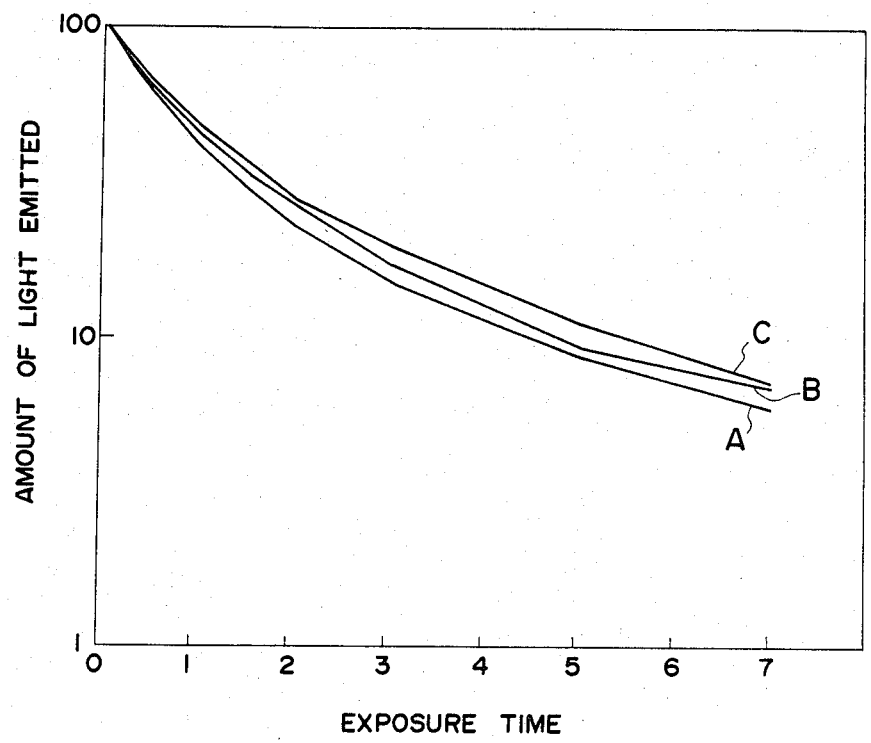
FIG. 1 is a graph showing the decay curve of the amount of light emitted from the stimulable phosphor upon exposure thereof to stimulating rays having a predetermined intensity.
Figure 2:
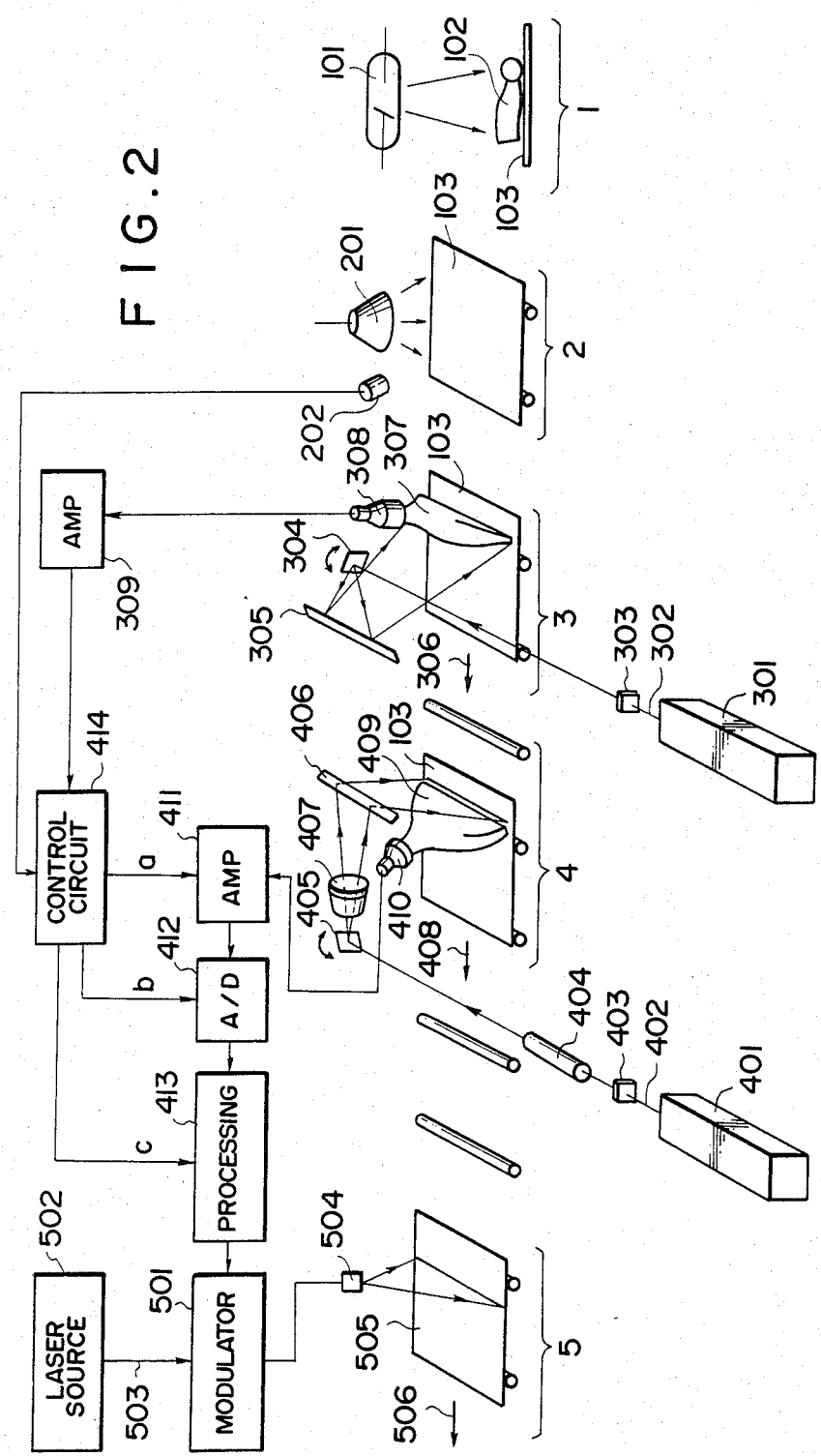
FIG. 2 is a schematic view showing the whole system of the radiation image recording system in which an embodiment of the radiation image read-out method in accordance with the present invention is employed.

FIG. 2 schematically shows a radiation image recording system in which an embodiment of the radiation image read-out method in accordance with the present invention is employed, and which comprises a recording section 1, a decay curve measuring section 2, a preliminary read-out section 3, a final read-out section 4 and an image reproducing section 5.

In the recording section 1, X-rays emitted from an X-ray source 101 pass through an object 102 and are absorbed into a stimulable phosphor sheet 103 to have an X-ray image of the object 102 stored thereon. The phosphor sheet 103 carrying the X-ray image stored thereon is then sent to the decay curve measuring section 2.

In the decay curve measuring section 2, the phosphor sheet 103 is positioned below a decay curve measuring light source 201, and the whole surface thereof is exposed to light emitted from the light source 201 for a predetermined period. The wavelength distribution of the light emitted from the light source 201 is restricted by a filter so that it does not overlap the wavelength distribution of light emitted from the phosphor sheet 103 upon stimulation thereof. The light emitted from the phosphor sheet 103 upon stimulation thereof is detected by a photodetector 202, the light receiving face of which is provided with a filter for transmitting only the light having the wavelength distribution of the light emitted from the phosphor sheet 103. The signal detected by the photodetector 202 is sent to a control circuit 414. The control circuit 414 calculates a difference signal between the beginning and the end of the exposure of the phosphor sheet 103 to the light emitted from the light source 201, and calculates the gradient of the decay curve. Alternatively, the difference signal or signals may be calculated between two or more arbitrary points during the exposure. When the determination of the decay curve is finished, the phosphor sheet 103 is sent to the preliminary read-out section 3.

In the preliminary read-out section 3, a laser beam 302 emitted from a laser source 301 is first passed through a filter 303 for cutting off the light beam having a wavelength within a range identical with the range of the wavelength of the light emitted from a stimulable phosphor sheet 103 upon stimulation by the laser beam 302. Then, the laser beam 302 is one-dimensionally deflected by a light deflector 304 such as galvanometer mirror and directed onto the stimulable phosphor sheet 103 by a plane reflection mirror 305. While the laser beam 302 impinges upon the stimulable phosphor sheet 103, the phosphor sheet 103 is moved in the direction of the arrow 306 (subsidiary scanning direction) and, consequently, the whole area of the phosphor sheet 103 is exposed to and scanned with the laser beam 302. The power of the laser source 301, the beam diameter of the laser beam 302, the scanning speed of the laser beam 302, and the moving speed of the phosphor sheet 103 are selected so that the stimulation energy of the laser beam 302 for preliminary read out is smaller than the stimulation energy of the laser beam for final read out. When exposed to the laser beam 302, the stimulable phosphor sheet 103 emits light in proportion to the X-ray energy stored thereon, and the emitted light enters a light guiding sheet 307. The light guiding sheet 307 has a linear light input face positioned close to the scanning line on the stimulable phosphor sheet 103, and a ring-shaped light output face in close contact with the light receiving face of a photodetector 308, which may be a photomultiplier. The light guiding sheet 307 is formed of a transparent thermoplastic resin sheet such as an acrylic resin sheet so that the light entering from the light input face can be effectively transmitted to the light output face by total reflection through the interior of the light guiding sheet 307. The light emitted from the stimulable phosphor sheet 103 upon stimulation thereof is guided in the interior of the light guiding sheet 307, emitted from the light output face of the light guiding sheet 307 and received by the photodetector 308. The light guiding sheet 307 may be of a shape and a material as disclosed in U.S. Pat. No. 4,346,295 (DE-OS No. 2,951,501) or European Patent Publication No. 32,521.

The light receiving face of the photodetector 308 is provided with a filter for transmitting only the light having the wavelength distribution of the light emitted from the stimulable phosphor sheet 103 and cutting off the light having the wavelength distribution of the stimulating ray, so that the photodetector 308 can detect only the light emitted from the stimulable phosphor sheet 103 upon stimulation thereof. The output of the photodetector 308 is amplified by an amplifier 309 and sent to the control circuit 414 of the final read-out section 4. The control circuit 414 calculates the decay curve based on the decay curve gradient obtained by the decay curve measurement, and corrects the image input information, which has been obtained by the preliminary read-out, based on the determined decay curve. On the basis of the image input information thus corrected, the control circuit 414 generates an amplification degree setting value (a), a scale factor setting value (b) and an image processing condition setting value (c). When the preliminary read-out is finished as described above, the stimulable phosphor sheet 103 is sent to the final read-out section 4.

In the final read-out section 4, a laser beam 402 emitted from a laser source 401 is first passed through a filter 403 for cutting off the light beam having a wavelength within the range identical with the range of the wavelength of the light emitted from the stimulable phosphor sheet 103 upon stimulation by the laser beam 402. Then, the beam diameter of the laser beam 402 is strictly adjusted by a beam expander 404. The laser beam 402 is then deflected by a light deflector 405 formed of a galvanometer mirror or the like, and directed onto the stimulable phosphor sheet 103 by a plane reflection mirror 406. Between the light deflector 405 and the plane reflection mirror 406 is positioned an $f\theta$ lens 407 for maintaining the beam diameter of the laser beam 402 uniform during the scanning of the laser beam 402 on the stimulable phosphor sheet 103. While the laser beam 402 impinges upon the stimulable phosphor sheet 103, the phosphor sheet 103 is moved in the direction of the arrow 408 (subsidiary scanning direction) and, consequently, the whole area of the phosphor sheet 103 is exposed to and scanned with the laser beam 402. Upon exposure to the laser beam 402, the stimulable phosphor sheet 103 emits light in proportion to the X-ray energy stored therein, and the light emitted enters a light guiding sheet 409 which is made of the same material and has the same construction as the light guiding sheet 307 used for preliminary read-out. The light emitted from the stimulable phosphor sheet 103 is guided in the interior of the light guiding sheet 409 through total reflection, emitted from the light output face of the light guiding sheet 409 and received by a photodetector 410. The light receiving face of the photodetector 410 is closely contacted with a filter for selectively transmitting only the light having the wavelength distribution of the light emitted from the stimulable phosphor sheet 103, so that the photodetector 410 can detect only the light emitted therefrom.

The light emitted from the phosphor sheet 103 and detected by the photodetector 410 in the final read-out is converted to an electric signal, amplified to an appropriate level by an amplifier 411 the sensitivity of which has been set by the amplification degree setting value (a), and then inputted into an A/D converter 412. In the A/D converter 412, the electric signal is converted to a digital signal with a scale factor which has been set by the scale factor setting value (b) to suit the signal fluctuation level. The digital signal thus obtained is inputted into a signal processing circuit 413, in which it is processed based on the image processing condition setting value (c) so as to obtain an X-ray image suitable for viewing and diagnostic purposes. The electric image signal obtained from the signal processing circuit 413 is sent to a light modulator 501 at the section 5.

In the image reproducing section 5, a laser beam 503 emitted from a recording laser source 502 is modulated by the light modulator 501 based on the electric image signal sent from the signal processing circuit 413, and directed onto a light-sensitive material 505 such as a photographic film by a scanning mirror 504 for scanning the light-sensitive material 505 with the laser beam 503. At this time, the light-sensitive material 505 is moved perpendicularly to the scanning direction, i.e. in the direction of the arrow 506. Accordingly, the X-ray image is reproduced on the light-sensitive material 505.

It should be understood that the present invention can be embodies in various ways other than the above described embodiments.

We claim:

1. In a radiation image read-out method in which a stimulable phosphor sheet carrying a radiation image stored therein is exposed to stimulating rays, light emitted from said stimulable phosphor sheet upon stimulation thereof is photoelectrically read out, and a visible radiation image is reproduced by use of the electric signal obtained, the radiation image read-out method comprising: prior to final read-out for obtaining said visible radiation image for viewing purposes, determining the gradient of a decay curve of said stimulable phosphor sheet by exposing said stimulable phosphor sheet to stimulating rays and detecting the amount of light emitted from said stimulable phosphor sheet upon stimulation thereof, conducting preliminary read-out for reading out image input information stored in said stimulable phosphor sheet by use of stimulating rays having stimulation energy lower than stimulation energy of stimulating rays used in said final read-out, and setting the read-out conditions in said final read-out and/or the image processing conditions based on said gradient of the decay curve and said image input information.

2. A method as defined in claim 1 wherein the decay curve is determined based on said gradient and said image input information is corrected based on said decay curve and said read-out conditions and/or said image processing conditions are set based on said corrected image input information.

3. A method as defined in claim 2 wherein said gradient of the decay curve is determined by exposing said stimulable phosphor sheet to the stimulating rays for a predetermined period and detecting the amount of light emitted from said stimulable phosphor sheet at two or more points of time during the exposure.

4. A method as defined in claim 3 wherein said stimulable phosphor sheet is uniformly exposed to the stimulating rays.

5. A method as defined in claim 2 wherein said gradient of the decay curve is determined by exposing said stimulable phosphor sheet twice or more to the stimulating rays and detecting the light emitted from said stimulable phosphor sheet at the time of each exposure, thereby measuring the change in the amount of the emitted light with time.

6. A method as defined in claim 2 wherein said preliminary read-out and said final read-out are conducted by scanning said stimulable phosphor sheet with respective stimulating rays.

7. A method as defined in claim 2 wherein the stimulating rays in said preliminary read-out and said final read-out are laser beams.

8. A method as defined in claim 1 wherein said gradient of the decay curve is determined by exposing said stimulable phosphor sheet to the stimulating rays for a predetermined period and detecting the amount of light emitted from said stimulable phosphor sheet at two or more points of time during the exposure.

9. A method as defined in claim 8 wherein said stimulable phosphor sheet is uniformly exposed to the stimulating rays.

10. A method as defined in claim 1 wherein said gradient of the decay curve is determined by exposing said stimulable phosphor sheet twice or more to the stimulating rays and detecting the light emitted from said stimulable phosphor sheet at the time of each exposure, thereby measuring the change in the amount of the emitted light with time.

11. A method as defined in claim 1 wherein said final read-out is conducted within one hour after said stimulable phosphor sheet is exposed to the stimulating rays for determining said gradient of the decay curve.

12. A method as defined in claim 1 wherein said preliminary read-out and said final read-out are conducted by scanning said stimulable phosphor sheet with respective stimulating rays.

13. A method as defined in claim 1 wherein the stimulating rays in said preliminary read-out and said final read-out are laser beams.

14. A radiation image read-out apparatus including stimulating rays emitting means for emitting stimulating rays to a stimulable phosphor sheet carrying a radiation image stored therein, a means for moving said stimulable phosphor sheet, and a light detecting means for photoelectrically reading out light emitted from said stimulable phosphor sheet in the pattern of the radiation image stored therein upon exposure thereof to said stimulating rays, wherein the improvement comprises a combination of a means for exposing the stimulable phosphor sheet to stimulating rays for determining a decay curve of light emitted from said stimulable phosphor sheets, a means for detecting light emitted from said stimulable phosphor sheet upon exposure for determining said decay curve, a means for determining a gradient of said decay curve based on the detected light emitted from said stimulable phosphor sheet upon exposure for determining said decay curve, a means for emitting stimulating rays for preliminary read-out having stimulation energy lower than stimulation energy of said stimulating rays for final read-out prior to emission of the stimulating rays for final read-out by said stimulating ray emitting means, and a means for setting the final read-out conditions and/or the image processing conditions based on the gradient of the decay curve and the image input information.

* * * * *